Figure 1:
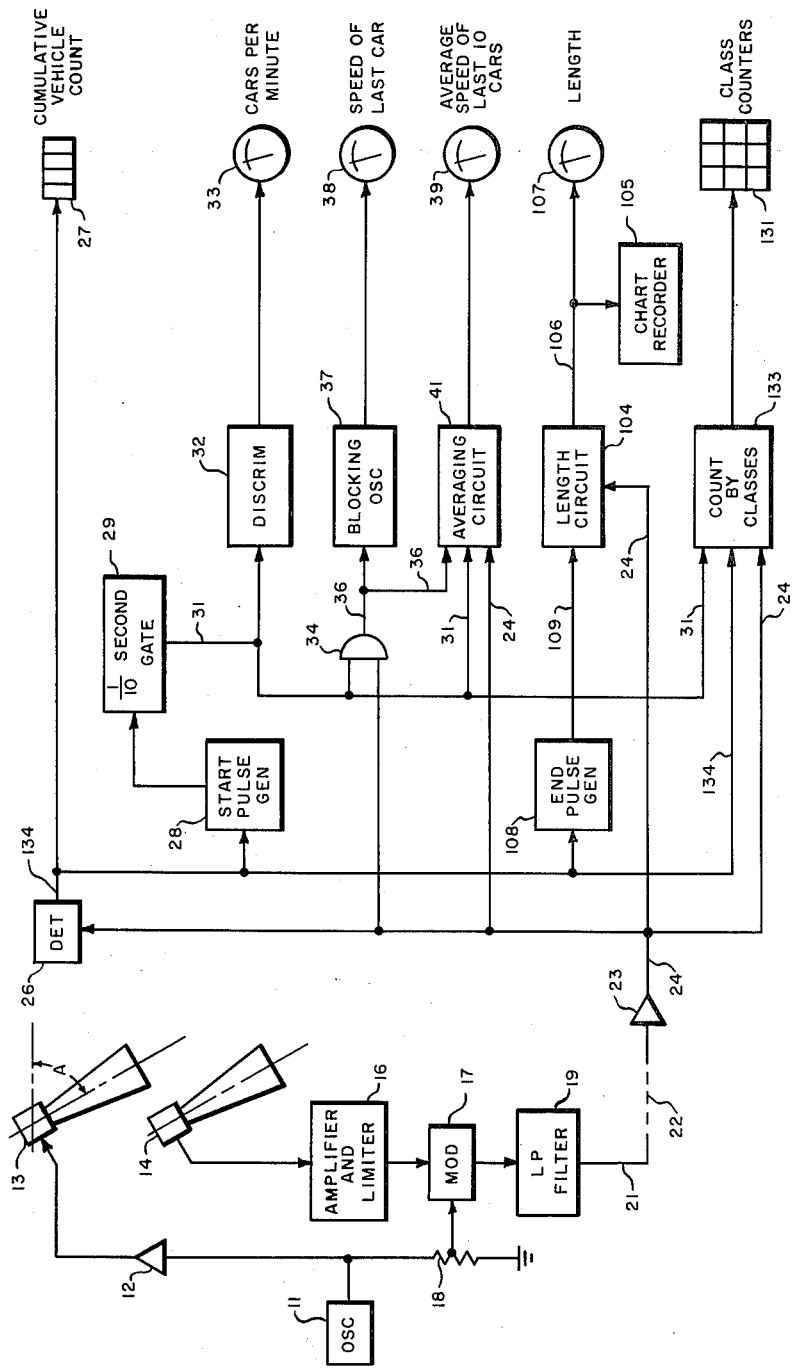

Aug. 3, 1965    E. B. HALES ET AL    3,199,074
AUTOMOBILE TRAFFIC FLOW ANALYZER
Filed June 8, 1962    4 Sheets-Sheet 2

Aug. 3, 1965  E. B. HALES ET AL  3,199,074
AUTOMOBILE TRAFFIC FLOW ANALYZER
Filed June 8, 1962  4 Sheets-Sheet 4

United States Patent Office 3,199,074
Patented Aug. 3, 1965

3,199,074
AUTOMOBILE TRAFFIC FLOW ANALYZER
Everett B. Hales, Hawthorne, and John P. McGuire, Briarcliff Manor, N.Y., assignors to General Precision, Inc., a corporation of Delaware
Filed June 8, 1962, Ser. No. 200,997
12 Claims. (Cl. 340—38)

This invention relates to a system and apparatus for measuring and analyzing the flow of automobile traffic on highways, roads and streets, and particularly to such apparatus utilizing acoustic signals for acquiring informational data.

In sensing and measuring the passage of cars and trucks, acoustic apparatus employing the Doppler principle has advantages over other methods. The Doppler acoustic method is simple and reliable. Power consumed is small, and the method can do anything which other methods, such as microwave radar, can do. Data produced are easily transmitted and reduced.

The principal information required from a traffic study includes vehicle count, average car speed and car length. Traffic density, or vehicles per unit space, can be derived from this information. Additional information useful in studies and in actual traffic control includes the speed of individual cars, vehicle count by classes, stopped traffic alarm, car height and the proportion of passenger cars to trucks. All of this information also can be secured from the system of this invention.

In selecting the acoustic frequency to be used, obviously it should be above audibility to prevent public disturbance. The intensity of the transmitted ultrasonic signal should, of course, be low enough to avoid biological or other damage.

Use of the Doppler principle results in simple equipment, and the results obtained are quite accurate enough for traffic analysis. As an example of such a system, a 40,000 c.p.s. generator excites a piezoelectric oscillator provided with a directional horn and serving as a transducer. The acoustic radiation at this frequency is directed slantingly downward in a narrow beam. This beam is aimed at oncoming traffic in one lane of an automobile highway. A second directional horn equipped with a receiver is placed beside the first horn and is aimed in the same direction. The receiver receives echoes from oncoming automobiles. These echoes are converted to electrical signals representing the echoes, and these signals are mixed with a small amount of the transmitter energy, so that the signals are heterodyne demodulated to form sum and difference frequency signals. Passage through a low-pass filter leaves only the difference frequencies, equal to the Doppler frequency differences in the echoes from oncoming cars. The blocks, groups or trains of oscillations, one train for each car, constitute the basic information. They can be tape recorded, transmitted by wire to another location, or employed in equipment at the site to secure the several kinds of information required.

An object of this invention is to provide instruments for automobile traffic measurement employing ultrasonic air radiations and utilizing the Doppler principle.

Another object is to secure automobile traffic information by employing an ultrasonic beam and deriving, from its echo from an oncoming automobile, an ultrasonic pulse of train signal containing Doppler difference frequencies.

Still another object is to secure, by Doppler acoustic means, information about automobile traffic including traffic count, speed, and lengths of cars.

Figure 4:
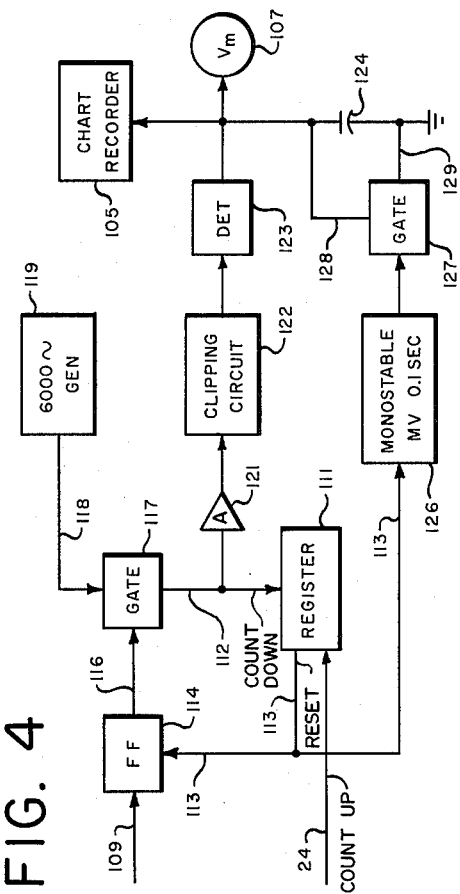
Figure 5:
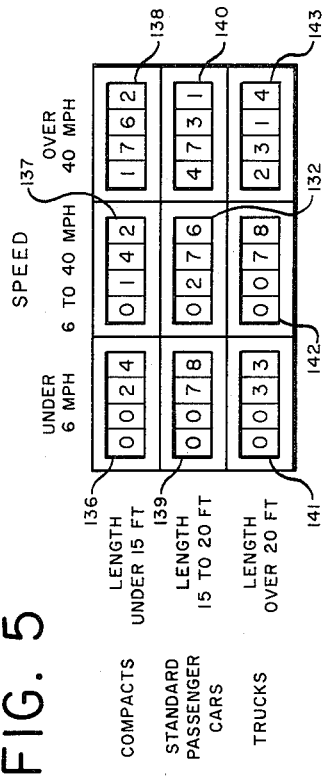
Figure 2:
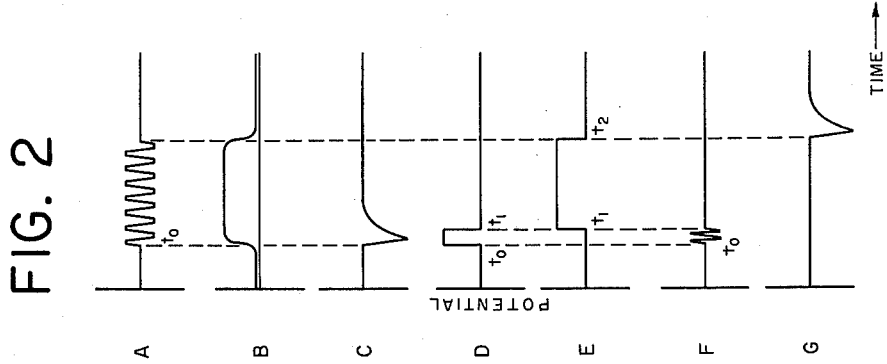
Figure 3:
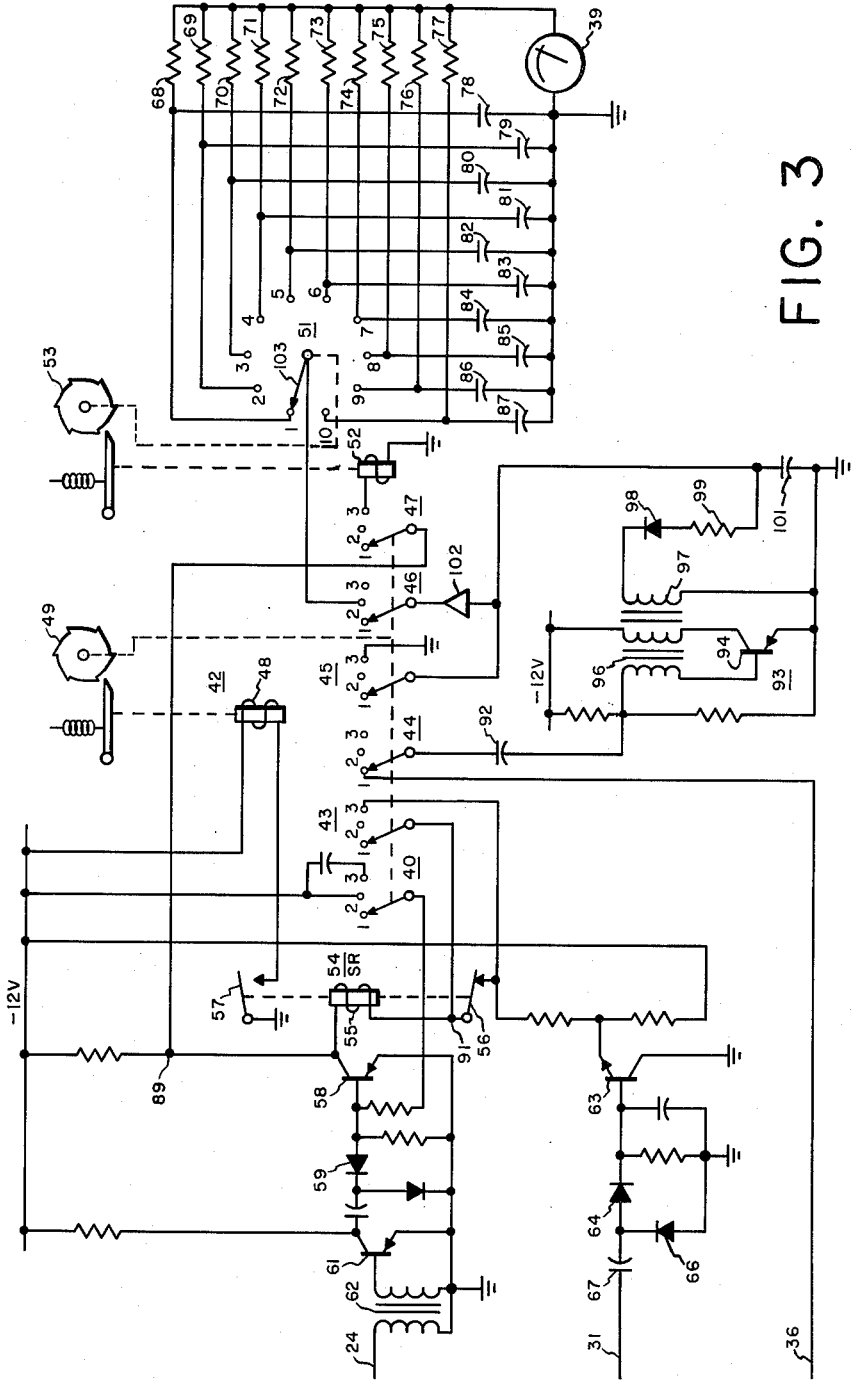
Figure 6:
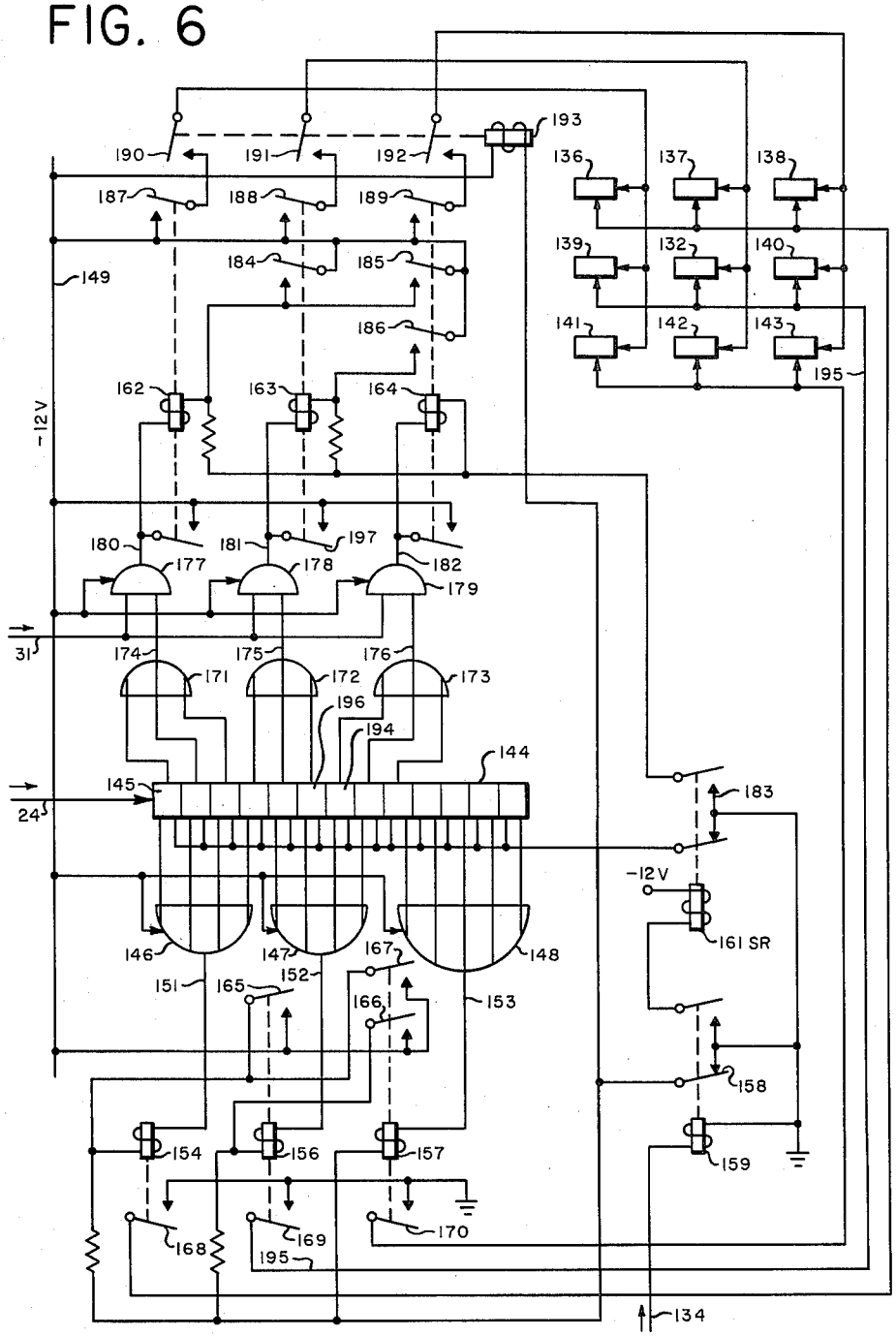

A further understanding of this invention may be secured from the detailed description and the drawings, in which:

FIGURE 1 is a block diagram of the system of the invention.
FIGURE 2 depicts waveforms utilized in explaining the operation of the invention.
FIGURE 3 is a schematic diagram of the circuit for securing an average car speed indication.
FIGURE 4 is a block diagram of a circuit for measuring the length of a vehicle by Doppler means.
FIGURE 5 is a plan view of the class counter panel.
FIGURE 6 is a schematic diagram of the count-by-classes circuit.

Referring now to FIGURE 1, an oscillator 11 emits an electrical signal having a frequency of 40 kc.p.s. This signal is amplified by the amplifier 12 to a power of about one-half watt, then is applied to a transducer 13 which converts the electrical energy to ultrasonic energy and radiates the energy in an ultrasonic beam of approximately 30°.

The transducer 13 may consist of a small, permanent-magnet loud speaker, or a piezoelectric, magnetostrictive or ionic sound source. In the present example it is preferred to use a piezoelectric transducer employing a crystal of barium titanate.

The conical horn of the transducer 13 is positioned vertically over the center of one traffic lane of a highway, and is directed downward at an angle, A, of about 60° to the horizontal. The horn can be positioned either to face oncoming traffic, or toward receding traffic, but for t¹ purpose of example the position facing traffic is chosr The height of the transducer 13 above the paving of ( traffic lane should be sufficient to clear all traffic but not so high as to make the slant angle to target automobiles greater than the normal range of the instrument, in this case about 22 feet.

An ultrasonic receiver 14 is positioned adjacent to the transmitting transducer 13 and pointing in the same direction. This receiver 14 also contains a piezoelectric transducer identical with the transmitting transducer. The horn of the receiving transducer 14 is identical with that of the transmitting transducer 13 and the receiver 14 is used to convert the reflected ultrasonic energy into an electrical signal.

The transducer 14 applies its electrical energy to a limiting amplifier 16, so that variations in amplitude of as much as 100 to 1 in the received energy are largely smoothed out. The resulting signal is applied to a heterodyne modulator 17 which also receives a part of the energy of oscillator 11 through a voltage divider 18. The output of modulator 17, containing sum and difference frequencies, is passed through a low-pass filter 19 having cutoff at about 5000 c.p.s.

In the operation of the transmitter 13 and receiver 14, acoustic energy is projected toward oncoming traffic at a frequency, $f_t$, of 40 kc.p.s. That portion which strikes the paving of the highway is partly reflected and is received at the same frequency, but that portion reflected from an oncoming car or truck is increased in frequency by the motion of the vehicle, because of the Doppler effect, so that the frequency, $f_r$, of this portion of the signal when received at 14, is $$f_r = f_t + \frac{2Sf_t}{C} \cos A \qquad (1)$$

in which S is the speed of the vehicle and C is the speed of sound in air. This received frequency, $f_r$, and the transmitted frequency, $f_t$, are subtracted in the modulator 17, so that the difference, or Doppler frequency, $f_d$, appears at the output 21 of the low-pass filter 19. That is $$f_d = f_r - f_t \qquad (2)$$

Thus the difference frequency, $f_d$, equals the last term of

Equation 1 and, as shown by this term, is proportional to car speed.

All of the components of the system so far described are conveniently positioned at the location of the transducers and horns 13 and 14. The signal at the output 21 of filter 19 contains all of the system information and constitutes the raw data output. All of the frequencies in it are in the audio range and may conveniently be transmitted over ordinary telephone lines or recorded on tape at the site for later data reduction. In FIGURE 1, the output 21 is shown transmitted over a line 22 to a distant location. There the signal is amplified by the amplifier 23 before application to the several data reduction components.

The graph A of FIGURE 2 depicts the signal at the output 24 of amplifier 23, representing the electrical Doppler signal derived from the echo from a single vehicle during its passage. This signal consists of a train of oscillations at the Doppler frequency, $f_d$, and at a nearly constant amplitude. The time duration of the train represents the time during which the echo was received by the receiving transducer 14 from the single vehicle. This signal train is detected by detector 26 to secure the envelope B, FIGURE 2, of signal A. This envelope is applied to a counter 27 which shows the cumulative total of vehicles in the lane passing the test site.

In order to secure a signal representing cars per minute, the envelope B, FIGURE 2, is applied from detector 26, FIGURE 1, to a start pulse generator 28 which derives, after inverting, a sharp negative pulse from the leading edge of the envelope, as shown at C, FIGURE 2. This is applied to start a monostable multivibrator circuit 29 generating a rectangular gate of potential having a duration of one-tenth second and a constant amplitude, as shown at D, FIGURE 2. The period of one-tenth second is chosen because it is less than the time duration of any signal train likely to be received. The gate output at conductor 31 is applied to a discriminator 32 which emits a direct potential having an amplitude linearly proportional to the input signal pulse frequency. Since each pulse represents the passage of one car, the pulse frequency represents the car frequency or rate.

Such a discriminator is described in Patent No. 2,584,866 entitled Frequency Measuring Device.

The output of discriminator 32 is applied to a potential-operated indicator 33 which indicates car rate in cars per minute.

To recapitulate, a Doppler signal train received from each car is detected to form a train envelope. A pulse is generated at the start of this envelope. Each start pulse initiates a 0.1 second gate pulse, all gate pulses having the same voltage amplitude and energy. These are applied to a discriminator emitting a potential representing the gate pulse rate and this potential actuates an indicator 33 calibrated in cars per minute.

Car speed, S, is measured by measuring the Doppler frequency in the echo returned from the car, in accordance with Equations 1 and 2. The Doppler frequency trains of oscillations in conductor 24 are applied to a logical AND circuit 34. The output of the 0.1 second gate 29 is also applied to the same AND circuit. The output of the AND circuit is applied through conductor 36 to a blocking oscillator 37 and from it to a voltage indicator 38.

In the operation of the car speed circuit, the Doppler frequency in the echo from a car represents its speed, in accordance with the Equations 1 and 2. Therefore, the Doppler cycles per unit time represent the Doppler frequency. Because car lengths and speeds differ, a unit time less than the time for high speed passage of a small car must be chosen, and the time chosen is 0.1 second. Then, if the number of Doppler cycles in 0.1 second is counted, the Doppler rate is secured. In FIGURE 1, the 0.1 second gate and the Doppler signal are both applied to the AND circuit 34, so that trains of oscillations of 0.1 second length at the Doppler frequency are emitted in conductor 36. It is only necessary to count the number of oscillations in each train to secure the Doppler frequency and thus the speed of the car represented by the train. The trains are applied to the blocking oscillator 37 which emits a unidirectional pulse for each Doppler cycle applied to it. All of these blocking oscillator output pulses are of equal energy content. They are applied to the direct-current voltmeter 38 which indicates, at the end of each 0.1 second gate period, a deflection representing the total energy received and therefore the number of cycles in the 0.1 second period. The voltmeter is calibrated in speed units and is termed the speed-of-last-car indicator.

The average speed of the last 10 cars is indicated, for an average traffic density, by the meter 39 operated by the averaging circuit 41. The Doppler train constitutes one input at conductor 24. A second input is taken through conductor 36 from the AND circuit output constituting a 0.1 second gated Doppler input, and a third input, the 0.1 second envelope gate pulse, is taken from the gate circuit 29 through conductor 31.

The averaging circuit is schematically illustrated in FIGURE 3. It includes a 3-step automatic stepping relay 42 having six banks of contacts 40, 43, 44, 45, 46 and 47, and an actuating coil 48. Its ratchet mechanism 49 steps the relay contacts forward each time that the relay coil 48 is deenergized. The circuit also includes a 10-step rotary switch 51 having an actuating coil 52. This switch has no stops and can rotate continuously. Its ratchet mechanism 53 operates to step the switch forward when the coil 52 is deenergized. An auxiliary relay 54 having a coil 55 and two contact arms 56 and 57 has a release delay time of 0.1 second. It is actuated through a transistor 58, diode 59, transistor 61 and isolating transformer 62 from the Doppler signal conductor 24. The relay coil 55 is also actuated through a transistor 63, diodes 64 and 66, and capacitor 67 from the 0.1-second gate conductor 31. Bank 44 of the stepping relay 42 has its first step contact connected to the gated Doppler conductor 36.

The ten contacts of the stepping switch 51 are connected respectively to ten resistors, 68 to 77, and to ten grounded capacitors 78 to 87. The other resistor terminals are grounded through an indicating, high impedance voltmeter 39.

In the operation of the circuit of FIGURE 3, assume that the stepping relay 42 rests in its first position, with contact arms on their first contacts, and that the rotary switch 51 rests on its number one contact. Relay 54 is in its released position, having −12 volts on both sides of its coil 55. Transistors 58, 61 and 63 are nonconductive in the absence of input signals.

At the time, $t_0$, when a Doppler signal train such as train A, FIGURE 2, is applied to conductor 24, transistor 61 amplifies the train and the resulting amplified output is detected at 59 and the negative envelope pulse is applied to transistor 58, making it conductive. This reduces the potential on terminal 89 of relay coil 55 from −12 volts to −½ volt. At the same time the front of a positive 0.1 second pulse in conductor 31, as shown at D, FIGURE 2, is applied through capacitor 67 and diode 64 to the base of transistor 63, making it conductive and reducing the potential on terminal 91 of relay coil 55 from −12 volts to −½ volt. Therefore relay 54 does not operate and remains normal.

At the time $t_1$, the 0.1 second gate in conductor 31 ends, restoring transistor 63 to nonconductivity. This applies −12 volts to the terminal 91 of coil 55, operating it. This breaks its own circuit at arm 56 and through arm 57 applies ground potential to coil 48 of the stepping relay 42, operating it. After 0.1 second, relay 54 releases, opening the circuit of coil 48, releasing it and stepping the stepping relay forward to contact 2. At the same time, relay 54 again closes its contact 56, is again energized, operates, energizes coil 48 of relay 42, and breaks its own contact 56. After another 0.1 second delay, relay 54 releases, releasing stepping relay coil 48, which steps its contacts to the third position. At the same time, relay 54 again closes its contact 56, is again energized and energizes coil 48. But now the contacts 56 are bridged at the stepping relay contact bank 43, so that relay 54 cannot release and thus cannot deenergize coil 48. Thus the stepping relay 42 now rests on its third contact. At the end of the signal in conductor 24, the Doppler envelope terminates and the potential at coil terminal 89 becomes −12 volts. Since this potential is also applied to the terminal 91, relay 54 after 0.1 second releases, deenergizing coil 48, which steps the stepping relay 42 back to its first contact. Now action stops, since coil 55 has −12 volts applied to both of its terminals.

The contact arm 40 is for the purpose of preventing misoperation when the Doppler signal applied to conductor 24 is less than 0.3 second in length. In such a case the stepping operation would be interrupted and the stepping relay would remain on contact 2 or 3 and could not step on to position 1. The contact arm 40, in such an event, applies potential to the base of transistor 58, keeping it conductive even in the absence of a Doppler signal until the stepping cycle has been completed and the stepping relay 42 has been returned to its first contact.

To recapitulate, −½ volt is applied to terminal 89 of coil 55 and −12 volts is applied to terminal 91 at time $t_1$ in graph E, FIGURE 2. This is available until the time $t_2$ when the Doppler envelope ends. The relays 54 and 42 operate and release after 0.1 second, stepping relay 42 to point 2, then again operate and release after 0.1 second, stepping relay 42 to point 3, then again operate and stay operated until the end of the envelope, when they release and relay 42 is stepped to its point 1 and stops.

The described operation charges one of the ten capacitors 78 to 87 with a charge representing the speed of the vehicle producing the Doppler signal $f_d$ on conductor 24. At time $t_0$ of graph F, FIGURE 2, a Doppler signal gated at 0.1 second and represented by this graph is applied through conductor 36, contact 1 of relay bank 44 and a coupling capacitor 92 to a blocking oscillator 93 comprising a transistor 94 and pulse transformer 96. This blocking oscillator emits a pulse from winding 97 for every cycle of the applied signal, these pulses being of substantially equal energy. These pulses are rectified by diode 98 and applied through a resistor 99 to a measuring capacitor 101. The charge, and hence the potential, attained by capacitor 101 is thus a measure of the number of cycles of the Doppler signal occurring in 0.1 second, therefore is a measure of the Doppler frequency and hence of the speed of the vehicle producing the Doppler signal. This charge is stored in capacitor 101.

Upon movement of relay 42 to its second position the potential of capacitor 101 amplified by amplifier 102 is applied through contact 2 of bank 46 to the arm 103 of switch 51. This arm at this time is assumed to be resting on its contact 1, and applies the potential to capacitor 78, giving it a charge and potential representative of the speed of the vehicle. This potential is also applied to the indicator 39. If, at the same time, some or all of the other capacitors 79 to 87 have potentials, they all are added by the summing network comprising the resistors 68 to 77, producing a composite effect on the meter 39 representative of the sum of all of the potentials, and therefore representative of the average of the last ten car speeds.

The charges on the capacitors leak off slowly through the resistors 68–77 to ground, so that, with average traffic density, after the passage of ten vehicles a charged capacitor has become substantially discharged.

The relay 42 rests on its second position for 0.1 second, during which time the charge transfer just described takes place. The relay 42 then moves to its third position. This grounds the capacitor 101 through the bank 45, discharging it. Through bank 47 the rotary switch coil 52 is connected to the terminal 89, so that, at the termination of the Doppler envelope, −12 volts at terminal 89 energizes coil 52 and holds it operated until the stepping relay 42 leaves its contact 3. When this occurs, the relay coil 52 is opened and the rotary switch 51 advances to its next position.

Indication of the length of a vehicle is accomplished by counting the number of cycles of Doppler frequency in the group signal representing the echoes received from the vehicle. This follows from Equations 1 and 2 and from the fact that car length, L, is equal to car speed, S, multiplied by the time $T_L$ required for the car to move its own length, or $$L = ST_L \qquad (3)$$

Combining equations (1), (2) and (3), $$L = \frac{C}{2f_t \cos A} T_L f_d \qquad (4)$$

The term $$\frac{C}{2f_t \cos A}$$

is a constant and the term $T_L f_d$ equals the number of Doppler cycles during the vehicle echo. Thus car length is linearly proportional to the number of cycles during the car echo.

If it is desired to indicate car length in the simplest manner, the Doppler data conductor 24, FIGURE 1, is merely connected to a counter which will count the total number of Doppler cycles in the signal received from a vehicle. The counter is reset by a pulse representing the trailing edge of the vehicle envelope, such as the pulse indicated by graph G, FIGURE 2.

If, however, a signal representing car length is to be recorded, a voltage magnitude signal is more suitable than a counter indication. A circuit for converting a Doppler cycle count into a voltage magnitude is indicated by the rectangle 104, FIGURE 1. Its output is connected through a conductor 106 to a voltmeter type of indicator 107 and a recorder 105. One input is taken from conductor 24. A second input consists of a stop pulse generated in an end pulse generator circuit 108 and applied through conductor 109. The pulse generator circuit 108 is connected to the detector 26 and emits a single pulse at the trailing edge of the Doppler envelope.

A suitable length circuit is indicated in FIGURE 4. A register 111 is capable of receiving a Doppler signal from conductor 24 and counting its cycles. The register, having counted forward, and the signal in conductor 24 having stopped, then can be made to count backwards at a rate of 6000 c.p.s. when alternating potential at that frequency is applied from conductor 112. Upon counting backward to zero the register stops and emits a pulse at conductor 113.

A flip-flop circuit 114 has a set input 109 connected to the end pulse generator 108, FIGURE 1. The reset input of flip-flop circuit 114, FIGURE 4, is constituted by the signal imposed on conductor 113. The flip-flop output at conductor 116 controls a gate circuit 117, making it conductive between conductors 118 and 112 when the flip-flop 114 is in its "set" condition, and making the circuit between these conductors 118 and 112 nonconductive when flip-flop 114 is in its "reset" condition. Conductor 118 is connected to the output of a 6000 c.p.s. generator 119.

Conductor 112 is connected through an amplifier 121 to a clipping circuit 122, the output of which is detected at 123, and the resulting pulsating direct current is applied to a capacitor 124. The capacitor potential is indicated by the voltmeter indicator 107 and is recorded by the chart recorder 105.

The conductor 113 is also connected to the input of a monostable multivibrator 126 having an output pulse period of one-tenth second. The one-tenth second period output of multivibrator 126 controls a gate circuit 127, making its circuit conductive between conductors 128 and 129 for the 0.1 second period. These conductors are connected across the capacitor 124.

In the operation of the length circuit of FIGURE 4, assume a waveform A, FIGURE 2, applied to conductor 24 and a waveform G applied to conductor 109. Let it be assumed that a waveform representing the Doppler signal from a car of average length contains about 950 cycles. This signal in conductor 24 causes register 111 to count forward, for example to 950, and stop. Coincident with its stopping, the end pulse in conductor 109 operates flip-flop 114, makes gate 117 conductive, thus connecting the output of generator 119 through conductor 112 to the register, which immediately commences to count backward. When it again reaches zero it stops and emits a pulse in conductor 113. This pulse resets flip-flop 114, making gate 117 nonconductive and interrupting the generator 119 output. The number of cycles of the 6000-cycle generator output employed to reset the register 111 is 950, the same as the number of Doppler cycles. These 950 cycles at the 6000 c.p.s. rate are additionally amplified at 121 and clipped at 122, then rectified by detector 123 to provide a constant average current flowing into capacitor 124 for a period of time representative of the number of Doppler cycles in the train. This current charges the capacitor to a charge and potential representing this period of time. This potential is indicated by the meter 107 and recorded by recorder 105. These instruments thus deflect proportionally to the number of Doppler cycles and to the length of the vehicle.

At the end of the train of 950 cycles at the 6000 c.p.s. rate, when the register 111 has been reset to zero, the pulse which it then emits on conductor 113 triggers the monostable 0.1-second multivibrator 126. Its 0.1-second duration pulse is applied to gate 127, making the path between conductors 128 and 129 conductive. This short circuits the measuring capacitor 124 for 0.1 second, placing it into readiness to receive the next charge.

A group of nine class counters 131, FIGURE 1, classify the total cumulative vehicle count by speed and length of vehicle. FIGURE 5 shows one form which the counter panel of this facility may take. Vehicles are here classified in three speed classes. One class includes speeds of less than 6 m.p.h., a second class includes speeds between 6 and 40 m.p.h., and a third class includes all speeds above 40 m.p.h. Lengths are classified as less than 15 feet, between 15 and 20 feet, and over 20 feet. In FIGURE 5 the counter 132, displaying the number 0276, shows that 276 cars travelling between 6 and 40 m.p.h. and having lengths between 15 and 20 feet have passed the test point since the start of the count.

The counter panel 131, FIGURE 1, is operated by a count-by-classes circuit 133. One input is taken from the raw data conductor 24, a second from the 0.1 second gate conductor 31 and a third from the train envelope conductor 134.

The count-by-classes circuit 133 is shown in detail in FIGURE 6, with nine electrically operated counters designated by numbers 132 and 136 to 143. The Doppler signal is applied through conductor 24 to the input terminal of a register 144 which may consist of a tandem-connected series of flip-flop or scale-of-two circuits. These circuits are designated by the subdivisions of the rectangle 144 symbolizing the register, the input conductor 24 being applied to the least significant digital unit 145. These units are grouped in several length groups and connected by groups to the inputs of several logical OR circuits, such as circuits 146, 147 and 148. These OR circuits are powered from a −12-volt bus 149, and are so designed that each, when actuated at any input, emits −12 volt potential on its output conductor, 151, 152 or 153. Each of these conductors is connected to a length interlock relay 154, 156 or 157. The other relay winding terminals are connected to ground through the back contact 158 of a readout relay 159. This relay also, when operated, operates a 0.1 second slow release relay 161 which resets the register 144 and the speed interlock relays 162, 163 and 164.

The interlock relays 154, 156 and 157 have three sets of interlock contacts, 165, 166 and 167, so connected that operation of relay 156 releases and locks open relay 154, and operation of relay 157 releases and locks open both relays 154 and 156. Each relay also has an output contact, 168, 169 and 170. Contact 168 applies ground potential to one side of the "under 15" class of length counters 136, 137 and 138. Contact 169 applies ground potential to one side of the "15–20" class of length counters 139, 132 and 140, and contact 170 applies ground potential to one side of the "over 20" class of length counters 141, 142 and 143.

The same register, 144, also furnishes speed information to the counters. The register units are grouped and outputs are applied by groups to three OR circuits, 171, 172 and 173. These groups are smaller than the length groups because the maximum number of Doppler cycles in 0.1 second is less than the maximum number of Doppler cycles in a complete train resulting from a vehicle echo. The OR circuit outputs 174, 175 and 176 are applied to inputs of three AND circuits, 177, 178 and 179. Each AND circuit has conductor 31 supplying the 0.1-second gate pulse to it as its second input. These circuits are also connected to the negative bus 149, so that, when an AND circuit has both inputs applied, it emits a −12-volt output. The AND circuit output conductors 180, 181 and 182 are connected respectively to the coils of relays 162, 163 and 164, the other coil terminals being joined and grounded through the normally open contact 183 of relay 161. These relays also are provided with interlocking contacts 184, 185 and 186, so that operation of relay 163 releases and locks open relay 162, and operation of relay 164 releases and locks open both relays 162 and 163.

The output contacts 187, 188 and 189 of relays 162, 163 and 164 are connected to terminals of the counters through the three normally open contacts 190, 191 and 192 of a relay 193. Contact 190 is connected to the three counters of the "under 6" speed class, contact 191 is connected to the three counters of the "6 to 40" speed class, and contact 192 is connected to the three counters of the "over 40" speed class.

In the operation of the count-by-classes circuit of FIGURE 6, let it be supposed that a Doppler signal train having a total of 950 cycles is applied through conductor 24 to the register 144. This number of cycles is proportional to the length of the vehicle. Also let it be supposed that 400 of these cycles are applied in the first tenth of a second. This rate or frequency is proportional to the speed of the vehicle.

Let it be supposed that 950 cycles operate the register 144 up to and including its unit 194. Thus, at the termination of the train this unit 194 and probably several of the lower units will be operated, causing OR circuit 147 to have an output on conductor 152 and possibly OR circuit 146 on conductor 151 also. However, at the start of the train the train envelope signal in conductor 134 operates relays 159 and 161, opening the ground connection for relays 154, 156 and 157. Upon termination of the train, relay 159 is released, grounding relay 156, which operates. Relay 154 is locked out. Relay 156 through conductor 195 applies ground potential to one side of counters 139, 132 and 140.

At the same time let it be supposed that the first 400 cycles of the signal in conductor 24 operate unit 196 of the register and may at the time of the 400th cycle cause operation of one or more of the preceding units. Thus an output occurs in output conductor 175 of OR circuit 172, and an output may or may not occur also in output conductor 174 of OR circuit 171. During the passage of these 400 cycles the 0.1 gate occurs in conductor 31, so that AND circuit 178 is energized and AND circuit 177 may be. Thus relay 163 is operated, securing ground through contact 183 of the operated relay 161, and locks closed through its locking contact 197. If relay 162 has been operated it is released and locked open by relay contact 184. Since the relay 159 is operated at this time, relay 193 is released and its contact 191 is open.

Upon termination of the envelope pulse in conductor 134, relay 159 is released, applying ground to relay 193, operating it and closing contact 191. This applies —12-volt potential to one terminal of each of the counters 137, 132 and 142. Of these, counter 132 is the only one having its other terminal grounded, so is the only one to be operated. This counter therefore advances one digit, thus counting one vehicle of length 15 to 20 feet having a speed of between 6 and 40 miles per hour.

After 0.1 second relay 161 releases, resetting the register 144 and releasing the relays 162, 163 and 164.

What is claimed is:

1. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
means for selecting a timed portion of each of said trains for deriving a gated sample therefrom, all samples having the same time duration,
and means indicating the number of Doppler oscillations in each said gated sample as speed of last car.

2. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal having a Doppler spectrum frequency band from said electrical manifestations,
detector means deriving the envelope of a train of Doppler frequency oscillations incorporated in said electrical signal, said train representing the entire echo received from a single vehicle,
a start pulse generator connected to said detector operated by the leading edge of said envelope,
a gate pulse generator connected to said start pulse generator emitting a pulse starting at the leading edge of said envelope, the pulse duration being less than the length of said train,
an AND circuit having the output of said gate pulse generator impressed on a first input thereof and having said electrical signal impressed on a second input thereof,
a blocking oscillator connected to said AND circuit and triggered thereby at each Doppler cycle emitted therefrom,
and an indicating meter connected to said blocking oscillator indicating a quantity proportional to the number of pulses produced by the blocking oscillator, said quantity being representative of the speed of the car generating the train.

3. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
gate means for deriving a portion of each train containing Doppler oscillations, all of said portions having the same time duration,
means for generating a direct-current signal in response to each portion, said direct-current signal having amplitude representing the number of Doppler oscillations in the portion,
and means for averaging the amplitudes of selected successive ones of said direct-current signals for providing a representation of the average speed of a plurality of said vehicles.

4. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
AND logic means for deriving a portion of each train thereof containing Doppler oscillations, all of said portions having the same time duration,
means for generating a direct-current signal in response to each portion, said direct-current signal having amplitude representing the number of Doppler oscillations in the portion,
means storing said direct-current signal as a charge in a measuring capacitor,
means transferring the charge of said measuring capacitor after each direct-current signal charge storage therein to a storage capacitor means,
means discharging said measuring capacitor completely after each transferral of charge therefrom,
and means measuring the composite charge in said storage capacitor means after a plurality of accretions of charge thereby from said measuring capacitor.

5. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
detector means deriving the envelope of a train of Doppler frequency oscillations incorporated in said electrical signal, said train representing the entire echo received from a single vehicle,
gate pulse generating means producing a gate pulse starting at the beginning of said train envelope from said electrical signal, the gate pulse duration being less than the length of said train envelope, relay means connected to said gate pulse generating means and to said detector means, said relay means being energized at the termination of said gate pulse and deenergized at the termination of said train envelope, a multiple-position multiple-bank automatic switch, circuit means interconnecting said automatic switch and said relay means to step said automatic switch forward and to stop at a selected point, means gating said electrical signal by said gate means to the duration of said gate pulse to form an input Doppler signal, a blocking oscillator, a measuring capacitor connected thereto, means including said automatic switch applying said input signal through said blocking oscillator to said measuring capacitor whereby the potential to which the measuring capacitor is charged is a measure of the speed of said vehicle generating said echoes, a step switch, means including said automatic switch for stepping said step switch forward, a plurality of capacitors connected each to one step of said step switch, a like number of resistors each connected at one end to respective ones of the steps of said step switch, the other ends of said resistors being grounded through an indicating meter, said resistors constituting a summing circuit, means including said automatic switch connecting said measuring capacitor to one of said plurality of capacitors after each charge of the measuring capacitor whereby the charge thereof is transferred to said one of the plurality of capacitors, and means thereafter momentarily short circuiting said measuring capacitor.

6. An automobile traffic flow analyzer comprising, means generating a beam of acoustic radiation having an ultrasonic frequency, means directing said beam toward a traffic lane adapted to carry vehicles having movement relative to the beam-directing means whereby echoes containing Doppler information are reflected from the vehicles, means receiving and converting said echoes into electrical manifestations representative thereof, means deriving an electrical signal from said electrical manifestations, said electrical signal including trains of Doppler frequency oscillations incorporated therein, each of said trains representing the entire echo received from a single vehicle, register means for counting the number of cycles of Doppler oscillations in one of said trains, means responsive to the count provided by said register for selectively indicating the length of the vehicle represented by said train in accordance with the number of cycles counted by said register, and means for resetting said register means after each count.

7. An automobile traffic flow analyzer comprising, means generating a beam of acoustic radiation having an ultrasonic frequency, means directing said beam toward a traffic lane adapted to carry vehicles having movement relative to the beam-directing means whereby echoes containing Doppler information are reflected from the vehicle, means receiving and converting said echoes into electrical manifestations representative thereof, means deriving an electrical signal from said electrical manifestations, said electrical signal including trains of Doppler frequency oscillations incorporated therein, each of said trains representing the entire echo received from a single vehicle, register means for counting the number of cycles of Doppler oscillations in each one of said trains, an oscillator having a constant frequency output higher than the Doppler frequency, gating means for coupling said constant frequency output to said register for returning the register to zero subsequent to each count of Doppler oscillations, means for counting the oscillations of said constant frequency output required for returning said register to zero, and means for indicating the count of said counting means.

8. An automobile traffic flow analyzer comprising, means generating a beam of acoustic radiation having an ultrasonic frequency, means directing said beam toward a traffic lane adapted to carry vehicles having movement relative to the beam-directing means whereby echoes containing Doppler information are reflected from the vehicles, means receiving and converting said echoes into electrical manifestations representative thereof, means deriving an electrical signal from said electrical manifestations, said electrical signal including trains of Doppler frequency oscillations incorporated therein, each of said trains representing the entire echo received from a single vehicle, an end pulse generator connected to said detector operated by the trailing edge of said envelope, a register operated by the Doppler cycles in said electrical signal, an alternating current generator connected to operate said register backward to reset it at zero, a flip-flop circuit set by said end pulse generator, a gate circuit in said alternating current generator output, means rendering said gate circuit conductive when said flip-flop circuit is set and nonconductive when said flip-flop circuit is reset, means connecting said register to said flip-flop for resetting said flip-flop when the register is reset to zero, and indicating means connected to the output of said gate circuit for indicating the number of cycles of said alternating current generator passed through said gate circuit.

9. An automatic traffic flow analyzer comprising, means generating a beam of acoustic radiation having an ultrasonic frequency.

means directing said beam toward a traffic lane adapted to carry vehicles having movement relative to the beam-directing means whereby echoes containing Doppler information are reflected from the vehicles, means receiving and converting said echoes into electrical manifestations representative thereof, means deriving an electrical signal from said electrical manifestations, said electrical signal including trains of Doppler frequency oscillations, incorporated therein, each of said trains representing the entire echo received from a single vehicle, means counting the number of Doppler frequency oscillations in a selected train and emitting a vehicle length signal in accordance with the number of Doppler frequency oscillations so counted, means measuring the time rate of Doppler frequency oscillations in said selected train and emitting a vehicle speed signal in accordance with the rate of Doppler frequency oscillations measured, a group of counters selectively operated for counting length and speed by classes of vehicles, and means applying said length signal and said speed signal to said group of counters for actuating a single counter in accordance with the class of the vehicle represented by the train.

10. An automobile traffic flow analyzer comprising, means generating a beam of acoustic radiation having an ultrasonic frequency, means directing said beam toward a traffic lane adapted to carry vehicles having movement relative to the beam-direction means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
a register for counting frequency oscillations,
logic circuit means including said register for counting the number of Doppler frequency oscillations in a selected train and emitting a signal representing the vehicle length according to the number of Doppler frequency oscillations counted,
means generating a gate signal starting at the front of said selected train and shorter than the train,
means including said register and said gate generating means for measuring the time rate of Doppler frequency oscillations in said selected train and emitting a signal representing speed of the vehicle according to the rate of Doppler frequency oscillations measured.
a group of counters coupled for counting vehicles in length and speed classes,
means applying said length signal to said group of counters for selectively operating one length class counter of a plurality of length class counters in accordance with the length of the vehicle,
and means applying said speed signal to said group of counters for selectively operating one speed class counter of a plurality of speed class counters in accordance with the speed of the vehicle, whereby one counter in both said length class and said speed class is actuated.

11. An automatic traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signal including trains of Doppler frequency oscillations incorporated therein, each of said trains representing the entire echo received from a single vehicle,
a frequency responsive register,
logic circuit means including said register and a selected number of OR circuits for counting the number of Doppler frequency oscillations in a selected train and emitting a vehicle length signal in accordance with the number of Doppler frequency oscillations counted,
means generating a gate signal starting at the front of said selected train and shorter than the train,
means including said register, said gate generating means, a second selected number of OR circuits and a second selected number of AND circuits for measuring the time rate of Doppler frequency oscillations in said selected train and emitting a vehicle speed signal in accordance with the rate of Doppler frequency oscillations measured,
a group of counters coupled for counting vehicle lengths and speeds in a selected number of classes,
means applying a length signal to one of a selected number of classes of said group of counters,
means applying a speed signal to one of another selected number of classes,
readout means actuating said last two named means at the end of said selected train,
and reset means resetting said register at the termination of said selected train.

12. An automobile traffic flow analyzer comprising,
means generating a beam of acoustic radiation having an ultrasonic frequency,
means directing said beam toward a traffic lane adapted to carry vehicles having movement relative to the beam-directing means whereby echoes containing Doppler information are reflected from the vehicles,
means receiving and converting said echoes into electrical manifestations representative thereof,
means deriving an electrical signal from said electrical manifestations, said electrical signa lincluding trains of Doppler frequency oscillations incorporated therein, each of said trains representing the entire echo received from a single vehicle,
detector means deriving an envelope signal from a selected train,
means connected to said detector means for generating a pulse beginning at the leading edge of said envelope signal and having a pulse duration less than the length of the envelope signal,
a register coupled for receiving said electrical signal and having a number of output circuits, said output circuits being energized in accordance with the frequency of said Doppler frequency oscillations,
vehicle length OR circuits connected to the output circuits of said register for selectively operating said OR circuits in accordance with the said output circuit energized,
interlock relays connected to said OR circuit outputs for limiting output to that of the most significant operated OR circuit,
a group of counters arranged in rows and columns,
means energizing each row of said group of counters from a respective one of said OR circuits,
vehicle speed OR circuits connected to the output circuits of said register for selectively operating said speed OR circuits in accordance with the output of said register energized,
vehicle AND circuits connected to the outputs of said speed OR circuits,
means applying said pulse to said speed AND circuits for gating said speed AND circuits,
speed interlock relays connected to said speed AND circuit outputs for limiting output to that of the most significant operated speed AND circuits,
readout relay means responsive to the end of the envelope signal output of said detector for interrupting the outputs of said speed AND circuits,
and means energizing each column of said group of counters from a respective one of said speed AND circuits.

References Cited by the Examiner

UNITED STATES PATENTS

| | | | | |
|---|---|---|---|---|
| 2,524,610 | 10/50 | Storm | | 343—8 |
| 2,859,433 | 11/58 | Saxton | | 343—8 |
| 3,059,232 | 10/62 | Barker | | 340—38 |

NEIL C. READ, *Primary Examiner.*

THOMAS B. HABECKER, *Examiner.*

Notice of Adverse Decision in Interference

In Interference No. 95,794 involving Patent No. 3,199,074, E. B. Hales and J. P. McGuire, AUTOMOBILE TRAFFIC FLOW ANALYZER, final judgment adverse to the patentees was rendered Sept. 20, 1968, as to claims 1, 2, 3 and 4.

[*Official Gazette December 17, 1968.*]